(12) United States Patent
Huston et al.

(10) Patent No.: US 10,543,459 B2
(45) Date of Patent: Jan. 28, 2020

(54) METHODS FOR THE TREATMENT OF A FLUE GAS STREAM USING CATALYTICALLY-ENHANCED SORBENT COMPOSITIONS

(71) Applicant: ADA Carbon Solutions, LLC, Littleton, CO (US)

(72) Inventors: Robert B. Huston, Longmont, CO (US); Roger H. Cayton, Castle Rock, CO (US); Joseph M. Wong, Castle Pines, CO (US); Jacob B. Lowring, Coushatta, LA (US)

(73) Assignee: ADA CARBON SOLUTIONS, LLC, Littleton, CO (US)

( * ) Notice: Subject to any disclaimer, the term of this patent is extended or adjusted under 35 U.S.C. 154(b) by 0 days.

(21) Appl. No.: 15/729,308

(22) Filed: Oct. 10, 2017

(65) Prior Publication Data

US 2018/0028970 A1 Feb. 1, 2018

Related U.S. Application Data

(62) Division of application No. 14/721,623, filed on May 26, 2015.
(Continued)

(51) Int. Cl.
*B01D 53/86* (2006.01)
*B01J 21/18* (2006.01)
(Continued)

(52) U.S. Cl.
CPC ......... *B01D 53/8665* (2013.01); *B01D 53/64* (2013.01); *B01D 53/83* (2013.01); *B01J 20/20* (2013.01); *B01J 20/28016* (2013.01); *B01J 20/28061* (2013.01); *B01J 20/28071* (2013.01); *B01J 21/18* (2013.01); *B01J 27/122* (2013.01); *B01J 27/128* (2013.01); *B01J 35/023* (2013.01);
(Continued)

(58) Field of Classification Search
None
See application file for complete search history.

(56) References Cited

U.S. PATENT DOCUMENTS 3,803,803 A 4/1974 Raduly et al.
3,873,581 A 3/1975 Fitzpatrick et al.
(Continued)

OTHER PUBLICATIONS

Office Action dated Oct. 6, 2016 for U.S. Appl. No. 14/721,623.
(Continued)

*Primary Examiner* — Joseph D Anthony
(74) *Attorney, Agent, or Firm* — Sheridan Ross PC

(57) ABSTRACT

A sorbent composition that is useful for injection into a flue gas stream of a coal burning furnace to efficiently remove mercury from the flue gas stream. The sorbent composition may include a sorbent with an associated ancillary catalyst component that is a catalytic metal, a precursor to a catalytic metal, a catalytic metal compound or a precursor to a catalytic metal compound. Alternatively, a catalytic metal or metal compound, or their precursors, may be admixed with the coal feedstock prior to or during combustion in the furnace, or may be independently injected into a flue gas stream. A catalytic promoter may also be used to enhance the performance of the catalytic metal or metal compound.

19 Claims, 3 Drawing Sheets

Related U.S. Application Data

(60) Provisional application No. 62/005,304, filed on May 30, 2014.

(51) Int. Cl.
| | | |
|---|---|---|
| *B01D 53/64* | (2006.01) | |
| *B01J 35/02* | (2006.01) | |
| *B01J 20/28* | (2006.01) | |
| *B01J 20/20* | (2006.01) | |
| *B01J 27/128* | (2006.01) | |
| *B01J 27/122* | (2006.01) | |
| *B01D 53/83* | (2006.01) | |
| *B01J 27/053* | (2006.01) | |
| *B01J 27/055* | (2006.01) | |
| *B01J 35/10* | (2006.01) | |
| *B01J 35/00* | (2006.01) | |
| *B01J 37/02* | (2006.01) | |

(52) U.S. Cl.
CPC .. *B01D 2253/102* (2013.01); *B01D 2253/304* (2013.01); *B01D 2253/306* (2013.01); *B01D 2253/308* (2013.01); *B01D 2253/31* (2013.01); *B01D 2253/311* (2013.01); *B01D 2255/202* (2013.01); *B01D 2255/204* (2013.01); *B01D 2255/2022* (2013.01); *B01D 2255/2025* (2013.01); *B01D 2255/2027* (2013.01); *B01D 2255/2042* (2013.01); *B01D 2255/2045* (2013.01); *B01D 2255/2047* (2013.01); *B01D 2255/2061* (2013.01); *B01D 2255/2065* (2013.01); *B01D 2255/2073* (2013.01); *B01D 2255/20723* (2013.01); *B01D 2255/20738* (2013.01); *B01D 2255/20761* (2013.01); *B01D 2255/20792* (2013.01); *B01D 2257/602* (2013.01); *B01D 2258/0283* (2013.01); *B01J 27/053* (2013.01); *B01J 27/055* (2013.01); *B01J 35/0026* (2013.01); *B01J 35/1019* (2013.01); *B01J 35/1038* (2013.01); *B01J 37/0201* (2013.01)

(56) References Cited

U.S. PATENT DOCUMENTS

| | | | |
|---|---|---|---|
| 4,199,472 A * | 4/1980 | Ohtsuka | A23L 3/3436 252/188.23 |
| 4,500,327 A | 2/1985 | Nishino et al. | |
| 4,677,096 A * | 6/1987 | van der Smissen | B01D 53/02 502/417 |
| 5,080,799 A * | 1/1992 | Yan | C02F 1/288 210/661 |
| 6,064,560 A | 5/2000 | Hirahara et al. | |
| 7,722,843 B1 | 5/2010 | Srinivasachar | |
| 8,080,088 B1 | 12/2011 | Srinivasachar | |
| 8,309,046 B2 * | 11/2012 | Pollack | B01D 53/02 423/210 |
| 8,551,431 B1 | 10/2013 | Adams et al. | |
| 9,314,767 B2 * | 4/2016 | McMurray | B01J 20/28004 |
| 9,539,538 B2 * | 1/2017 | Wong | B01D 53/64 |
| 2002/0198097 A1 | 12/2002 | El-Shoubary et al. | |
| 2005/0039598 A1 | 2/2005 | Srinivasachar et al. | |
| 2007/0123419 A1 | 5/2007 | Le Bec | |
| 2009/0007785 A1 | 1/2009 | Kimura et al. | |
| 2009/0111690 A1 | 4/2009 | Gadkaree et al. | |
| 2011/0172091 A1* | 7/2011 | Sugimoto | A23L 3/3436 502/404 |
| 2013/0109562 A1* | 5/2013 | Wong | B01D 53/64 502/181 |
| 2014/0191157 A1* | 7/2014 | Wong | B01J 20/041 252/186.24 |
| 2016/0296908 A1* | 10/2016 | Li | B01J 20/20 |
| 2018/0029009 A1* | 2/2018 | Li | B01J 20/28071 |

OTHER PUBLICATIONS

Office Action dated Mar. 23, 2017 for U.S. Appl. No. 14/721,623.
Office Action dated Oct. 6, 2017 for U.S. Appl. No. 14/721,623.
Office Action dated May 10, 2018 for U.S. Appl. No. 14/721,623.
Office Action dated Nov. 28, 2018 for U.S. Appl. No. 14/721,623.
Office Action dated Feb. 9, 2018 for U.S. Appl. No. 15/729,414.
Notice of Allowanced dated Jul. 23, 2018 for U.S. Appl. No. 15/729,414.
Notice of Allowanced dated Nov. 1, 2018 for U.S. Appl. No. 15/729,414.

\* cited by examiner

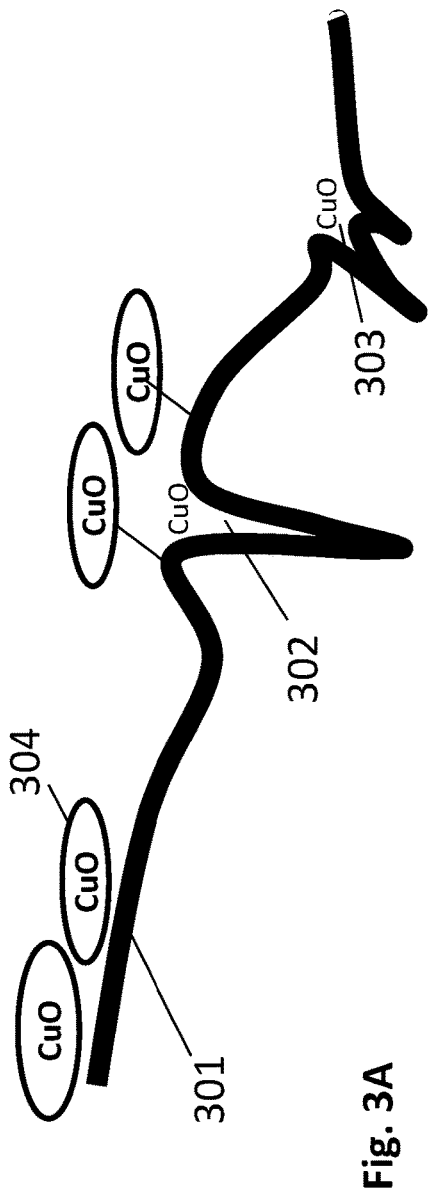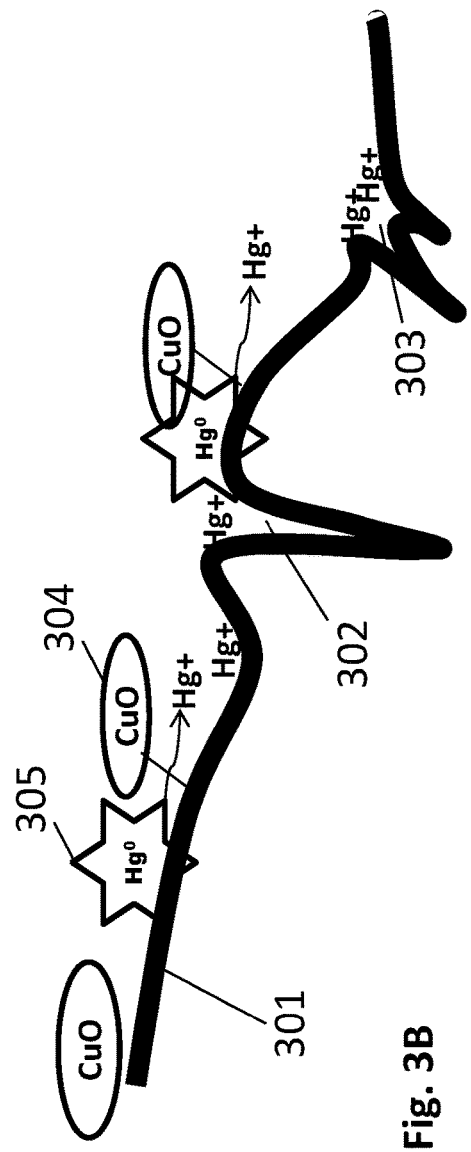
Fig. 3A
Fig. 3B

METHODS FOR THE TREATMENT OF A FLUE GAS STREAM USING CATALYTICALLY-ENHANCED SORBENT COMPOSITIONS

CROSS-REFERENCE TO RELATED APPLICATIONS

This application claims the priority benefit as a divisional application of co-pending U.S. patent application Ser. No. 14/721,623 filed on May 26, 2015, which claims the priority benefit under 35 U.S.C. § 119(e) of U.S. Provisional Application Ser. No. 62/005,304 filed on May 30, 2014. Each of these applications is incorporated herein by reference in its entirety.

FIELD

This disclosure relates to the field of compositions for efficient removal of contaminants such as mercury from flue gas streams.

BACKGROUND

Mercury is well known to be a highly toxic compound. Exposure at appreciable levels can lead to adverse health effects for people of all ages, including harm to the brain, heart, kidneys, lungs, and immune system. Although mercury is naturally occurring, most mercury emissions result from various human activities such as burning fossil fuels and other industrial processes. For example, in the United States about 40% of the mercury introduced into the environment comes from coal-fired power plants.

In the United States and Canada, federal and state/provincial regulations have been implemented or are being considered to reduce mercury emissions, particularly from coal-fired power plants, steel mills, cement kilns, waste incinerators and boilers, industrial coal-fired boilers, and other coal-combusting facilities. For example, the United States Environmental Protection Agency (EPA) has promulgated Mercury Air Toxics Standards (MATS), which would, among other things, require coal-fired power plants to capture at least approximately 80% to 90% of their mercury emissions beginning in 2015.

The leading technology for mercury control from coal-fired power plants is activated carbon injection. Activated carbon injection involves the injection of sorbents, particularly powder activated carbon, into flue gas emitted by the boiler of a power plant. Powder activated carbon ("PAC") is a porous carbonaceous material having a high surface area, which exposes significant amounts of beneficial chemically functional and reaction sites and which creates high adsorptive potential for many compounds, including capturing mercury from the flue gas. Activated carbon injection technology has shown the potential to control mercury emissions in most coal-fired power plants, even those plants that may achieve some mercury control through control devices designed for other pollutants, such as wet or dry scrubbers used to control sulfur dioxide and acid gases.

The capture and removal of mercury from a boiler flue gas through activated carbon injection can be characterized by three primary steps, which may occur sequentially or simultaneously: (1) contact of the injected sorbent particle, e.g. an activated carbon such as PAC, with the mercury species, which is typically present in very dilute concentrations in the flue gas (e.g., <100 parts per billion); (2) oxidation of elemental mercury (i.e., $Hg^0$), which is relatively inert and not easily adsorbed, into an oxidized mercury species (e.g., $Hg^+$ and $Hg^{+2}$), which is more readily adsorbable and is significantly more soluble in an aqueous solubilizing medium such as water; and (3) sequestration of the oxidized mercury species by the pores of the sorbent where it is held tightly (e.g., sequestered) without being released. The flue gas streams traverse the ductwork at very high velocities, such as in excess of 25 feet/second. Therefore, once injected, the sorbent must rapidly contact, oxidize and sequester the mercury. In some instances, the sorbent only has a residence time of about 1 to 2 seconds in the flue gas.

Activated carbon injection technology may be less effective in coal combustion facilities that produce flue gas streams with relatively high concentrations of acid gases and/or acid gas precursors, such as sulfur oxides (e.g., $SO_2$ and $SO_3$) and nitrogen oxides (e.g., $NO_2$ and $NO_3$). Under conditions of high temperature, moisture, and pressure such as in a flue gas, acids such as sulfuric acid ($H_2SO_4$) and nitric acid ($HNO_3$) can form from the precursors. It is believed that these acids may inhibit or slow the mercury capture mechanism by interfering with the reaction and adsorption sites on the sorbent that would otherwise be used to capture and bind mercury. For example, it has been observed that flue gases with concentrations of $SO_3$ as low as 3 ppm can detrimentally affect mercury capture rates.

Acid gas precursors and/or acid gases typically come from three primary sources. The first is the coal feedstock fed to the boiler as the fuel source. Certain types of coal inherently have high concentrations of sulfur, nitrogen, chlorine, or other compounds which can form acid gases in the flue gas. For example, coals such as Illinois basin coal with high sulfur content (e.g., above about 2 wt. %) are becoming more common as a boiler feedstock for economic reasons, as high sulfur coals tend to be cheaper than low sulfur coals. A second source is the selective catalytic reduction (SCR) step for controlling emissions of $NO_x$. An unintended consequence of this process is that $SO_2$ in the flue gas can be oxidized to form $SO_3$. A third source is that the power plant operator may be injecting $SO_3$ into the flue gas stream to enhance the efficiency of the particulate removal devices, e.g., to avoid opacity issues and increase the effectiveness of an electrostatic precipitator (ESP) in removing particulates from the flue gas stream. Accordingly, it may not be practical for a power plant operator with any of the foregoing (or similar) operating conditions to use conventional PAC to capture mercury and cost-effectively comply with government regulations such as EPA MATS.

Several technologies have been proposed to address these situations where the presence of acid gas precursors and/or acid gases inhibits mercury capture performance. One such technology is the separate injection of dry alkaline compounds such as trona, calcium oxide, calcium hydroxide, calcium carbonate, magnesium carbonate, magnesium hydroxide, magnesium oxide, sodium bicarbonate, and sodium carbonate into the flue gas to mitigate the acid gases. Aqueous solutions may also be injected into the flue gas stream, including sodium bisulfate, sodium sulfate, sodium carbonate, sodium bicarbonate, sodium hydroxide, or thiosulfate solutions.

Another technology involves the simultaneous injection of PAC and an acid gas agent, either as an admixture or with a composition including PAC that has been treated with the agent. The acid gas agents may include alkaline compounds such as sodium bicarbonate, sodium carbonate, ammonium carbonate, ammonium bicarbonate, potassium carbonate, potassium bicarbonate, trona, magnesium oxide, magnesium hydroxide, calcium oxide, calcium hydroxide, calcium bicarbonate and calcium carbonate. Yet another technology involves the co-injection of PAC and an acid gas agent, where the acid gas agent may include Group I (alkali metal) or Group II (alkaline earth metal) compounds, or compounds including halides and a non-metal cation such as nitrogen, e.g., ammonium halides, amine halides, and quaternary ammonium halides.

The use of a halogen in sorbent compositions is a leading technology used to oxidize mercury to a form that can be captured, such as is disclosed in U.S. Pat. No. 9,539,538 to Wong et al., which is incorporated herein by reference in its entirety. In addition, in some cases the halogen, such as bromine is added separately from the sorbent as in U.S. Pat. No. 8,309,046 to Pollack et al. In some cases the halogen is present in the sorbent in concentrations of 10 wt. % or more. However, addition of halogens such as bromine to the flue gas stream may cause corrosion of treatment units. In addition, non-protective scales can be formed because of the presence of hydrobromic acid (HBr) in the flue gas. Hydrobromic acid is formed from the interaction of $Br_2$ with water through multicomponent condensation when the flue gas temperature is below a corresponding hydrobromic acid dew point; subsequently, dew point corrosion occurs on the metal surface. At temperatures over the hydrobromic acid dew point, gaseous bromine is capable of diffusing through the oxide layer to the scale-metal interface where it reacts with the iron to form iron bromide. The volatile iron bromide may then diffuse outward to the scale surface, where it is converted to a solid oxide at the elevated oxygen concentration. The formed free bromine is either released to the bulk gas or diffuses back to the scale-metal interface, and thus a cycle is formed. The same bromine corrosion and regeneration cycles may proceed via $FeBr_3$, and it is possible for the ferrous iron to be oxidized to the ferric state while the oxidation liberates bromine as well. In addition to the corrosive effects of adding bromine into the flue gas stream, several other plant issues can also arise; bromine accumulation in the wet scrubbers, deterioration of the fabrics in a baghouse, and the decrease of selenium capture within the plant's native fly ash.

SUMMARY

In one embodiment, a sorbent composition for the removal of contaminants from a flue gas stream is disclosed. The sorbent composition comprises a powdered activated carbon sorbent, the sorbent having a mean particle diameter (D50) of not greater than about 25 µm, a surface area of at least about 350 $m^2/g$ and total pore volume of at least about 0.20 cc/g. The sorbent composition also comprises an ancillary catalyst component comprising at least one constituent selected from the group consisting of a catalytic metal, a precursor to a catalytic metal, a catalytic metal compound, and a precursor to a catalytic metal compound.

A number of characterizations, refinements and additional features are applicable to this embodiment of a sorbent composition. These characterizations, refinements and additional features are applicable to this embodiment of a sorbent composition individually or in any combination.

In one characterization, the sorbent composition further comprises a halogen. In one refinement, the sorbent composition comprises not greater than about 15 wt. % of the halogen. In another refinement, the sorbent composition comprises not greater than about 6 wt. % of the halogen. In another refinement, the sorbent composition comprises not greater than about 3 wt. % of the halogen. In a further characterization, the sorbent composition comprises substantially no halogens.

In another characterization of the foregoing embodiment, the ancillary catalyst component is coated onto the powdered activated carbon sorbent. In another characterization, the powdered activated carbon sorbent has a mean particle diameter (D50) of not greater than about 20 µm. In one refinement, the powdered activated carbon sorbent has a mean particle diameter (D50) of not greater than about 15 µm. In another characterization, the sorbent composition comprises at least about 0.001 wt. % of the ancillary catalyst component. In one refinement, the sorbent composition comprises at least about 0.002 wt. % of the ancillary catalyst component. In a further refinement, the sorbent composition comprises at least about 0.004 wt. % of the ancillary catalyst component. In yet a further refinement, the sorbent composition comprises at least about 0.010 wt. % of the ancillary catalyst component. In another characterization, the sorbent composition comprises not greater than about 20 wt. % of the ancillary catalyst component, and in one refinement the sorbent composition comprises not greater than about 5 wt. % of the ancillary catalyst component.

In another characterization, the ancillary catalyst component comprises a catalytic metal or a precursor to a catalytic metal. In one refinement, the catalytic metal is selected from the group consisting of iron (Fe), copper (Cu), manganese (Mn), palladium (Pd), gold (Au), silver (Ag), platinum (Pt), iridium (Ir), vanadium (V), nickel (Ni), zinc (Zn), tin (Sn), titanium (Ti), cerium (Ce), and combinations thereof. In another refinement, the catalytic metal is selected from the group consisting of Fe, Cu, Mn, Zn and combinations thereof.

In another characterization of the sorbent composition, the ancillary catalyst component comprises a catalytic metal compound or a precursor to a catalytic metal compound. The catalytic metal compound is selected from the group consisting of a metal salt, a metal oxide, a metal halide, a metal hydroxide, a metal sulfate, a metal nitrate, a metal carbonate, and combinations thereof. In one refinement, the catalytic metal compound is selected from the group consisting of copper (II) oxide (CuO), copper (II) chloride ($CuCl_2$), copper (II) nitrate ($Cu(NO_3)_2$), copper (II) hydroxide ($Cu(OH)_2$), copper (II) carbonate ($CuCO_3$), iron (III) oxide ($Fe_2O_3$), iron (III) chloride ($FeCl_3$), iron (III) nitrate ($Fe(NO_3)_3$), iron (III) sulfate $Fe_2(SO_4)_3$, cerium (IV) oxide ($CeO_2$), manganese (IV) oxide ($MnO_2$), vanadium (V) oxide ($V_2O_5$), zinc (II) oxide (ZnO) and zinc sulfate ($ZnSO_4$).

The sorbent composition of the foregoing embodiment may further comprise a catalytic promoter dispersed on the powdered activated carbon. In one refinement, the catalytic promoter comprises a promoter metal compound selected from the group consisting of alkali metal compounds and alkaline earth metal compounds. In a further refinement, the catalytic promoter comprises a metal in elemental form or in the form of a metal oxide, metal hydroxide, or metal salt, the metal being selected from the group consisting of aluminum (Al), lithium (Li), sodium (Na), potassium (K), beryllium (Be), calcium (Ca), strontium (Sr), barium (Ba), scandium (Sc), yttrium (Y), magnesium (Mg) and combinations thereof.

In another embodiment, a method for the removal of one or more contaminants from a flue gas stream is disclosed herein. The method comprises the steps of combusting a fuel source, the combusting generating a flue gas stream comprising one or more contaminants, contacting the flue gas stream with a solid sorbent and with an ancillary catalyst component, maintaining the ancillary catalyst component in contact with the flue gas stream for a period of time sufficient to catalytically oxidize at least a portion of the one or more contaminants and form an oxidized contaminant species, and sequestering the oxidized contaminant species with the solid sorbent.

A number of characterizations, refinements and additional features are applicable to this embodiment of a method for the removal of contaminants from a flue gas stream. These characterizations, refinements and additional features are applicable to this embodiment of a sorbent composition individually or in any combination.

In one characterization, the solid sorbent has a mean particle diameter (D50) of not greater than about 25 μm. In one refinement, the solid sorbent has a mean particle diameter (D50) of not greater than about 20 μm and in yet a further refinement, the solid sorbent has a mean particle diameter (D50) of not greater than about 15 μm. In another characterization, the solid sorbent comprises powdered activated carbon.

In another characterization, the ancillary catalyst component comprises a catalytic metal selected from the group consisting of Fe, Cu, Mn, Zn, Pd, Au, Ag, Pt, Ir, V, Ni, Ce, and mixtures thereof. In one particular refinement, the ancillary catalyst component comprises a catalytic metal selected from the group consisting of Fe, Cu, Mn, Zn and combinations thereof. In another characterization, the ancillary catalyst component comprises a catalytic metal compound that is selected from the group consisting of a metal salt, a metal oxide, a metal halide, a metal hydroxide, a metal carbonate, and combinations thereof. In one refinement, the catalytic metal compound is selected from the group consisting of copper (II) oxide (CuO), copper (II) chloride ($CuCl_2$), copper (II) nitrate ($Cu(NO_3)_2$), copper (II) hydroxide ($Cu(OH)_2$), copper (II) carbonate ($CuCO_3$), iron (III) oxide ($Fe_2O_3$), iron (III) chloride ($FeCl_3$), iron (III) nitrate ($Fe(NO_3)_3$), iron (III) sulfate $Fe_2(SO_4)_3$, cerium (IV) oxide ($CeO_2$), manganese (IV) oxide ($MnO_2$), vanadium (V) oxide ($V_2O_5$), zinc (II) oxide (ZnO) and zinc sulfate ($ZnSO_4$).

The method of the foregoing embodiment may also include the step of contacting the flue gas stream with a catalytic promoter. In one refinement, the catalytic promoter comprises a metal selected from the group consisting of alkali metals and alkaline earth metals. In another refinement, the catalytic promoter comprises a metal selected from the group consisting of Al, Li, Na, K, Be, Ca, Sr, Ba, Sc, Y, Mg and combinations thereof.

In another characterization of the foregoing method, the flue gas stream is contacted with the solid sorbent and with the ancillary catalyst component in the absence of any added halogen. In another characterization, the one or more contaminants comprises mercury. In yet another characterization, the solid sorbent comprises powdered activated carbon. In another characterization, the ancillary catalyst component is dispersed on the solid sorbent to form a sorbent composition comprising catalytically active sorbent particles. In another characterization, the ancillary catalyst component is physically separate from the solid sorbent when the ancillary catalyst component is contacted with the flue gas stream. In one refinement, the ancillary catalyst component or a precursor to the ancillary catalyst component is injected into the flue gas stream separate from the solid sorbent. In yet another characterization, the ancillary catalyst component or a precursor to the ancillary catalyst component is added to the fuel source before or during combustion of the fuel source. In one characterization, the fuel source comprises coal.

In another embodiment, a method for the manufacture of a sorbent composition is disclosed. The method comprises dispersing an ancillary catalyst component comprising a metal with a solid sorbent, the solid sorbent having a surface area of at least about 350 $m^2/g$ and pore volume of at least about 0.20 cc/g.

A number of characterizations, refinements and additional features are applicable to this embodiment of a method for the removal of contaminants from a flue gas stream. These characterizations, refinements and additional features are applicable to this embodiment of a sorbent composition individually or in any combination.

In one characterization, the solid sorbent is a carbonaceous sorbent. In one refinement, the solid sorbent comprises powdered activated carbon.

In another characterization, the ancillary catalyst component and the solid sorbent form an admixture. In one refinement, the dispersing step comprises dry admixing the solid sorbent and the ancillary catalyst component or a precursor to the ancillary catalyst component. In another characterization, the ancillary catalyst component is deposited upon the solid sorbent. In another characterization, the method includes combining, before the dispersing step, a halogen with the ancillary catalyst component. In yet another characterization, the dispersing step comprises contacting the solid sorbent with a metal or metal-containing compound in a gas phase to deposit the ancillary catalyst component or a precursor to the ancillary catalyst component onto the solid sorbent. In another characterization, the dispersing step comprises contacting the solid sorbent with a metal or metal-containing compound in a liquid phase to deposit the ancillary catalyst component or a precursor to the ancillary catalyst component onto the solid sorbent. In one refinement, the ancillary catalyst component or precursor to the ancillary catalyst component is at least partially solubilized in the liquid phase.

In yet another characterization, the method also comprises the step of dispersing a catalytic promoter with the solid sorbent and the ancillary catalyst component. In one refinement, the catalytic promoter comprises a metal selected from the group consisting of alkali metals and alkaline earth metals. In another refinement, the catalytic promoter comprises a metal selected from the group consisting of Li, Na, K, Mg, Ca, Ba and Al. In yet another characterization, the catalytic promoter comprises a metal selected from the group consisting of metals from Group I, Group II, and Group III elements. In a further characterization, the flue gas stream contains acid gases in a concentration of at least about 3 ppm.

Additional embodiments, characterizations and refinements of sorbent compositions, methods for the manufacture of sorbent compositions and methods for the treatment of flue gas streams will be apparent from the following description, including the drawings.

DESCRIPTION OF THE DRAWINGS

FIGS. 3A and 3B illustrate a method of mercury capture by a sorbent composition disclosed herein.

DETAILED DESCRIPTION

Figure 1:
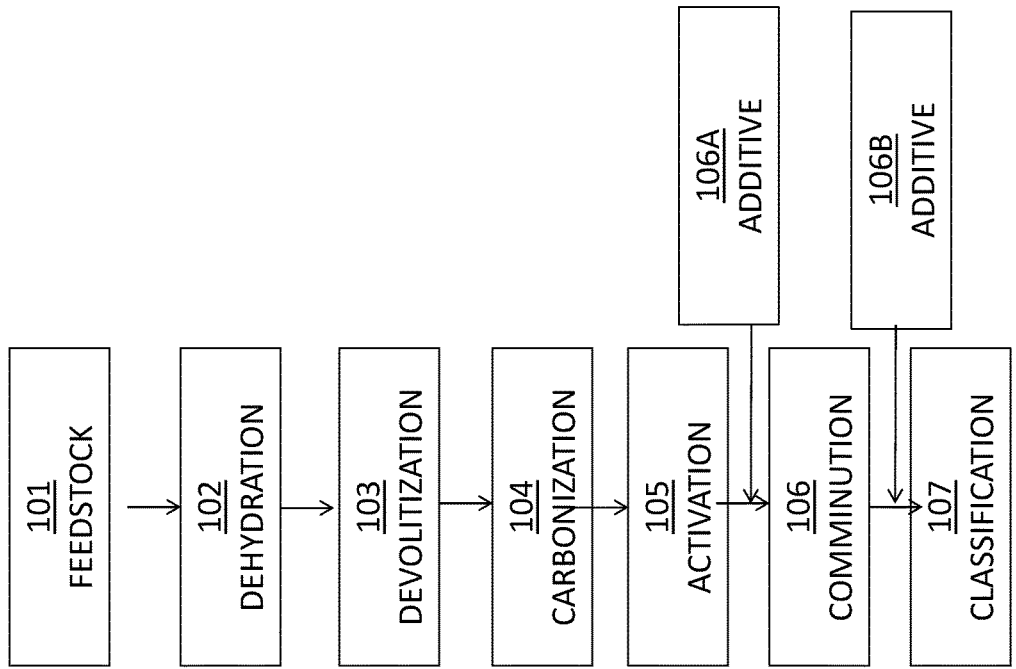
FIG. 1 illustrates a flow sheet for the manufacture of the sorbent composition.

It would be advantageous to provide a novel sorbent composition with little or no added halogen, that can act as efficiently as highly halogenated PAC sorbents to remove mercury from a flue gas stream, e.g., to meet governmental regulations for mercury emissions even in the presence of increased concentrations of acid gases. In this regard, disclosed herein are compositions of matter that are particularly useful for injection into a flue gas stream emanating from a boiler (e.g., a coal burning and/or biomass burning boiler) to remove mercury from the flue gas stream. These compositions may be used to replace a halogen oxidant, or may be used in conjunction with halogen oxidants thus allowing reduced amounts of corrosive halogens such as bromine to be used as compared to other mercury oxidizing compositions and may be efficient mercury oxidizers and capture agents in flue gas streams, even those flue gas streams with increased levels of acid gases. The compositions may include an ancillary catalyst component that is selected to oxidize mercury and/or catalyze the oxidation of mercury, making the mercury more available for capture by the sorbent, thereby enhancing the removal of mercury from the flue gas stream.

Various examples of a sorbent composition are provided that are particularly useful to rapidly and efficiently capture and remove contaminants, including but not limited to mercury, from the flue gas stream. In this regard, the sorbent composition may include a sorbent, such as powdered activated carbon (PAC), in combination with one or more components that synergistically may increase the probability of the sorbent contacting mercury species in the flue gas, and may decrease the time required for mercury oxidation and capture (e.g., as a result of enhanced oxidation reaction kinetics and/or mass diffusional kinetics).

In a particular embodiment, the sorbent is a carbonaceous sorbent such as PAC, and may have various beneficial physical attributes such as a relatively small particle size, a high surface area and a well-controlled pore size distribution. For example, the sorbent composition (i.e., the solid sorbent) may have a median particle size of not greater than about 25 µm, a sum of micropore volume, mesopore volume and macropore volume (e.g., a total volume) of at least about 0.2 cc/g, such as at least about 0.25 cc/g, and a ratio of micropore volume to mesopore volume of at least about 0.7 and not greater than about 1.5.

In one characterization, the sorbent is a particulate solid sorbent (e.g., PAC) that has a high pore volume and a well-controlled distribution of pores, particularly among the mesopores (i.e., from 20 Å to 500 Å width) and the micropores (i.e., not greater than 20 Å width). A well-controlled distribution of micropores and mesopores is desirable for effective removal of mercury from the flue gas stream. While not wishing to be bound by any theory, it is believed that the mesopores are the predominant structures for capture and transport of the oxidized mercury species to the micropores, whereas micropores are the predominate structures for sequestration of the oxidized mercury species.

In this regard, the sum of micropore volume plus mesopore volume and macropore volume of the sorbent (e.g., PAC) may be at least about 0.10 cc/g, such as at least 0.20 cc/g, at least about 0.25 cc/g or even at least about 0.30 cc/g. The micropore volume of the sorbent may be at least about 0.10 cc/g, such as at least about 0.15 cc/g. Further, the mesopore volume of the sorbent may be at least about 0.10 cc/g, such as at least about 0.15 cc/g. In one characterization, the ratio of micropore volume to mesopore volume may be at least about 0.7, such as 0.9, and may be not greater than about 1.5. Such levels of micropore volume relative to mesopore volume advantageously enable efficient capture and sequestration of oxidized mercury species by the sorbent. Pore volumes may be measured using gas adsorption techniques (e.g., $N_2$ adsorption) using instruments such as a TriStar II Surface Area Analyzer (Micromeritics Instruments Corporation, Norcross, Ga., USA).

In another characterization, the sorbent is a particulate solid sorbent that has a relatively high surface area. For example, the solid sorbent may have a surface area of at least about 350 $m^2/g$, such as at least about 400 $m^2/g$ or even at least about 500 $m^2/g$. Surface area may be calculated using the Brunauer-Emmett-Teller (BET) theory that models the physical adsorption of a monolayer of nitrogen gas molecules on a solid surface and serves as the basis for an analysis technique for the measurement of the specific surface area of a material. BET surface area may be measured using the Micromeritics TriStar II 3020 (Micromeritics Instrument Corporation, Norcross, Ga.).

In another characterization, the sorbent may have a median particle size of not greater than about 30 µm, such as not greater than about 25 µm, such as not greater than about 15 µm. Characterized in another way, the median particle size may be at least about 5 µm, such as at least about 6 µm, or even at least about 8 µm. The D50 median particle size may be measured using techniques such as light scattering techniques (e.g., using a Saturn DigiSizer II, available from Micromeritics Instrument Corporation, Norcross, Ga.). A relatively small median particle size, such as not greater than about 15 µm, means greater external surface area per volume of the same sorbent. The increased surface area may result in many benefits, including, but not limited to, increased exposure of the mercury to chemical species (e.g., elements or compounds) disposed on the sorbent surface, increased area available for reactions to occur, and thus overall improved reaction kinetics.

The sorbent may comprise a porous carbonaceous sorbent material (e.g., fixed carbon) that is adapted to provide a large surface area in the appropriate pore size to sequester contaminant species such as mercury, bromine, selenium, etc. The sorbent may include at least about 10 weight percent of fixed carbon, such as at least about 15 weight percent or even at least about 20 weight percent fixed carbon. In some characterizations, the fixed carbon content of the sorbent may not exceed about 95 weight percent, such as not greater than about 85 weight percent, such as not greater than about 75 weight percent, such as not greater than about 60 weight percent, or such as not greater than about 55 weight percent fixed carbon. Due to a well-controlled pore structure and the presence of the other components in the sorbent (e.g., in addition to fixed carbon), a relatively low amount of fixed carbon may be required for sequestration of contaminants.

In addition to a sorbent, such as powdered activated carbon, the sorbent composition may comprise an ancillary catalyst component that includes one or more of a catalytic metal, a precursor to a catalytic metal, a catalytic metal compound or a precursor to a catalytic metal compound. The catalytic metal(s) or metal compounds are selected to catalyze the oxidation of a contaminant such as mercury to a contaminant species that is more easily captured by the sorbent due to the charge (e.g., ionic charge) of the oxidized form, and/or due to the size of the oxidized form. If the ancillary catalyst component comprises a precursor to a metal or a precursor to a metal compound, the precursor should be capable of rapidly converting to the catalytic metal or the catalytic metal compound at the temperatures typically encountered in a flue gas stream, such as at least about 250° F. (about 120° C.) and not greater than about 700° F. (about 370° C.). The catalytic metal or catalytic metal compound may be associated with the sorbent in that it may be covalently bound to the sorbent, it may be associated with the sorbent via ionic binding, and/or it may be associated with the sorbent through intramolecular forces.

The ancillary catalyst component may comprise a catalytic metal that is selected from metals that are categorized as transition metals, e.g., Fe, Cu, Mn, Pd, Au, Ag, Pt, Ir, V, Ni, Zn and Ti. The ancillary catalyst component may also include other metals such as Sn and Ce. In one characterization, the catalytic metal may be selected from the group consisting of Fe, Cu, Mn, Zn and combinations thereof. The catalytic metal(s) may be present as elemental metals (e.g., in the zero valent state), or as an ionic species, or in the form of catalytic metal compounds including oxides, hydroxides, or salts such as sulfates, carbonates, nitrates, and halides, of the catalytic metals. Examples of such catalytic metal compounds may include, but are not limited to, copper (II) oxide (CuO), copper (II) chloride ($CuCl_2$), copper (II) sulfate ($CuSO_4$), copper (II) nitrate ($Cu(NO_3)_2$), copper (II) hydroxide ($Cu(OH)_2$), copper (II) carbonate ($CuCO_3$), iron (III) oxide ($Fe_2O_3$), iron (III) chloride ($FeCl_3$), iron (III) nitrate ($Fe(NO_3)_3$), iron (III) sulfate ($Fe_2(SO_4)_3$), iron (II) chloride ($FeCl_2$), cerium (IV) oxide ($CeO_2$), manganese (IV) oxide ($MnO_2$), vanadium (V) oxide ($V_2O_5$), zinc oxide (ZnO), or zinc sulfate ($ZnSO_4$).

The sorbent composition may include the ancillary catalyst component (e.g., the catalytic metal, catalytic metal compound or precursors thereto) in a concentration that is sufficient to enhance the oxidation of mercury in the flue gas stream. In some examples, as little as about 10 ppm by weight (0.001 wt. %) of the ancillary catalyst component may be sufficient. Thus, in one characterization, the sorbent composition may comprise at least about 10 ppm (0.001 wt. %) of the ancillary catalyst component, at least about 20 ppm (0.002 wt. %), at least about 40 ppm (0.004 wt. %), at least about 100 ppm (0.010 wt. %) at least about 200 ppm (0.020) wt. % of the ancillary catalyst component, or at least about 5000 ppm (0.5 wt. %). In another characterization, the sorbent composition may include not greater than about 20 wt. %, such as not greater than about 10 wt. %, not greater than about 5 wt. %, not greater than about 1 wt. %, not greater than about 0.5 wt. %, not greater than about 500 ppm (0.050 wt. %), or even not greater than about 200 ppm (0.020 wt. %) of the ancillary catalyst component. In one particular characterization, the sorbent composition comprises at least about 0.5 wt. % and not greater than about 5 wt. % of the ancillary catalyst component.

Optionally, the sorbent composition may also include a catalytic promoter, e.g., dispersed on the sorbent, e.g., dispersed on the powdered activated carbon. The catalytic promoter may comprise, for example, a metal species (e.g., compound) selected from Group 1 metals (i.e., alkali metals), Group 2 metals (i.e., alkaline earth metals), or Group 3 metals, their ionic species, salts, oxides, halides, or combinations thereof. For example, the catalytic promoter may comprise a metal in elemental form or in the form of a metal oxide, hydroxide, or salt, the metal being selected from the group consisting of Al, Li, Na, K, Be, Ca, Sr, Ba, Sc, Y, Mg and combinations thereof.

The ancillary catalyst component may be present in the composition alone or with other additions, such as a halogen, to a sorbent. However, reduced amounts of halogens such as Br may be enabled by the addition of the ancillary catalyst component. As such, the sorbent composition may advantageously comprise not greater than about 20 wt. % of a halogen, such as not greater than about 15 wt. %, not greater than about 6 wt. %, not greater than about 3 wt. %, or even not greater than about 1 wt. % of a halogen. In one characterization, the sorbent composition comprises substantially no halogens, i.e., from 0 to not greater than about 0.1 wt. % halogens.

In various characterizations, the sorbent may be selected from the group consisting of activated carbon, reactivated carbon, carbonaceous char, zeolite, silica, silica gel, alumina, clay or combinations thereof. In a particular characterization, the particulate sorbent comprises a porous carbonaceous material, for example powdered activated carbon.

One component of the sorbent may be inherent minerals, being native to the sorbent. These inherent minerals may also catalyze the oxidation of the elemental mercury in the flue gas stream but may be limited in availability for interaction with flue gas stream compounds and elements. These minerals may include, but not limited to, aluminum-containing minerals, calcium-containing minerals, iron-containing minerals, silicon-containing minerals (e.g., silicates), sodium-containing minerals, potassium-containing minerals, zinc-containing minerals, tin-containing minerals, magnesium-containing minerals, and combinations thereof. The minerals may predominantly be oxide-based minerals, such as metal oxide minerals (e.g., CaO, $Fe_2O_3$, $Fe_3O_4$, FeO, $Al_2O_3$), and silicates (e.g. $Al_2SiO_5$). In one characterization, the minerals predominantly include metal oxides, particularly aluminum oxides and iron oxides. In another characterization, the minerals include calcium-containing minerals, iron-containing minerals and aluminosilicates. The inherent minerals, being disposed within the sorbent framework, may have less surface functionality compared to the ancillary catalyst component, and thereby may be less active for mercury oxidation.

Moreover, the sorbent composition may also include an amount of aqueous-based solubilizing medium such as water. Such aqueous-based solubilizing medium can combat the acidity of the flue gas, enhance the mass diffusional kinetics of mercury oxidation and sequestration reactions by solubilizing oxidized mercury species within the pore structure, and prevent captured mercury from re-solubilizing and reentering the flue gas. In this regard, the sorbent composition may include at least about 2 wt. % of the solubilizing medium, such as at least about 3 wt. % or at least about 6 wt. %. However, the amount of solubilizing medium in the sorbent composition should be not greater than about 12 wt. %, such as not greater than about 10 wt. %, such as to avoid interfering with the mercury oxidation reaction(s), particle flow, and consuming carbon adsorption capacity.

In one example, a method for manufacture of a sorbent composition is provided. FIG. 1 is a flow sheet that illustrates an exemplary method for the manufacture of a sorbent composition in accordance with one example. The manufacturing process begins with a carbonaceous feedstock 101 such as low-rank lignite coal with a relatively high content of natural deposits of native minerals. In the manufacturing process, the feedstock is subjected to an elevated temperature and one or more oxidizing gases under exothermic conditions for a period of time to sufficiently increase surface area, create porosity, alter surface chemistry, and expose and exfoliate native minerals previously contained within feedstock. The specific steps in the process include: (1) dehydration 102, where the feedstock is heated to remove the free and bound water, typically occurring at temperatures ranging from 100° C. to 150° C.; (2) devolatilization 103, where free and weakly bound volatile organic constituents are removed, typically occurring at temperatures above 150° C.; (3) carbonization 104, where noncarbon elements continue to be removed and elemental carbon is concentrated and transformed into random amorphous structures, typically occurring at temperatures of from about 350° C. to about 800° C.; and (4) activation 105, where steam, air or other oxidizing agent(s) is added and pores are developed, typically occurring at temperatures above 800° C.

The manufacturing process may be carried out, for example, in a multi-hearth or rotary furnace. The manufacturing process is not discrete and steps can overlap and use various temperatures, gases and residence times within the ranges of each step to promote desired surface chemistry and physical characteristics of the manufactured product. After activation 105, the product may be subjected to a comminution step 106 to reduce the particle size (e.g., reduce the median particle size) of the activated product. Comminution 106 may occur, for example, in a mill such as a roll mill, jet mill or other like process. Comminution 106 may be carried out for a time sufficient to reduce the median particle size of the thermally treated product to not greater than about 30 µm, such as not greater than about 25 µm, or even 15 µm, 12 µm or less. Following comminution, classification 107 may take place wherein particles of a given size are selected.

In the event that manufacturing conditions result in a greater number of carbonaceous particles that have a very fine size than is desired, classification 107 may be carried out to remove such very fine particles from the larger carbonaceous particles. For example, classification 107 may be carried out using an air classifier, screen/mesh classification (e.g., vibrating screens) or centrifugation. Smaller particles may also be agglomerated to reduce the concentration of fine particles. The potential benefits of such a classification step are described in U.S. Pat. No. 9,314,767 to McMurray et al., which is incorporated herein by reference in its entirety.

Addition of the ancillary catalyst component, and optionally a catalyst promoter, may take place before (106A) or after comminution (106B), and in one characterization occurs after comminution of the sorbent to maximize the available surface area for attachment of the additional components. This may be accomplished by dry admixing, impregnation, or by coating the sorbent with the ancillary catalyst component or the catalytic promoter. For example, the catalytic promoter may be added in an optional subsequent step following addition of the ancillary catalyst component. Coating of the sorbent with the ancillary catalyst component may be accomplished by first making an aqueous solution or slurry of the ancillary catalyst component and then applying the solution directly to the sorbent either by mixing with or spraying onto the sorbent such as in a fluidized bed coater, as an example. Additional additives may be combined with the ancillary catalyst component, for example a halogen or a catalytic promoter.

The sorbent compositions disclosed herein are particularly useful for removal of metal contaminants, especially mercury, from flue gas streams. The ability to capture mercury may be measured by a dynamic mercury index (DMI) test that measures mercury (Hg) captured in micrograms of Hg per gram of sorbent composition (µg Hg/g sorbent composition). An increase in, or higher DMI, or µg Hg/g carbon (µg/g) captured, is an indication of a higher mercury capture efficiency of a sorbent. The DMI test simulates conditions in a coal burning facility's flue gas stream. The test system includes a preheater, sorbent feed, mercury feed, and reaction chamber. The mercury is fed into a reactor chamber along with the sorbent composition, wherein they are entrained. Uncaptured mercury is analyzed and DMI calculated. Temperature of the entrained mercury and sorbent is kept at about 325° F. (163° C.). Air entrainment and injection rates of between about 1 and about 5 lb./MMacf (pounds sorbent per one million actual cubic feet) are maintained such that residence time of the sorbent in the reaction chamber is about one second to simulate electrical generation unit (EGU) facility conditions. The mercury concentration in the system is approximately 10 µg/m$^3$.

In one example, the DMI of the sorbent compositions disclosed herein is at least about 100 µg/g, such as at least about 150 µg/g, at least about 300 µg/g, at least about 400 µg/g, at least about 500 µg/g, at least about 550 µg/g, or even at least about 590 µg/g.

Figure 2:
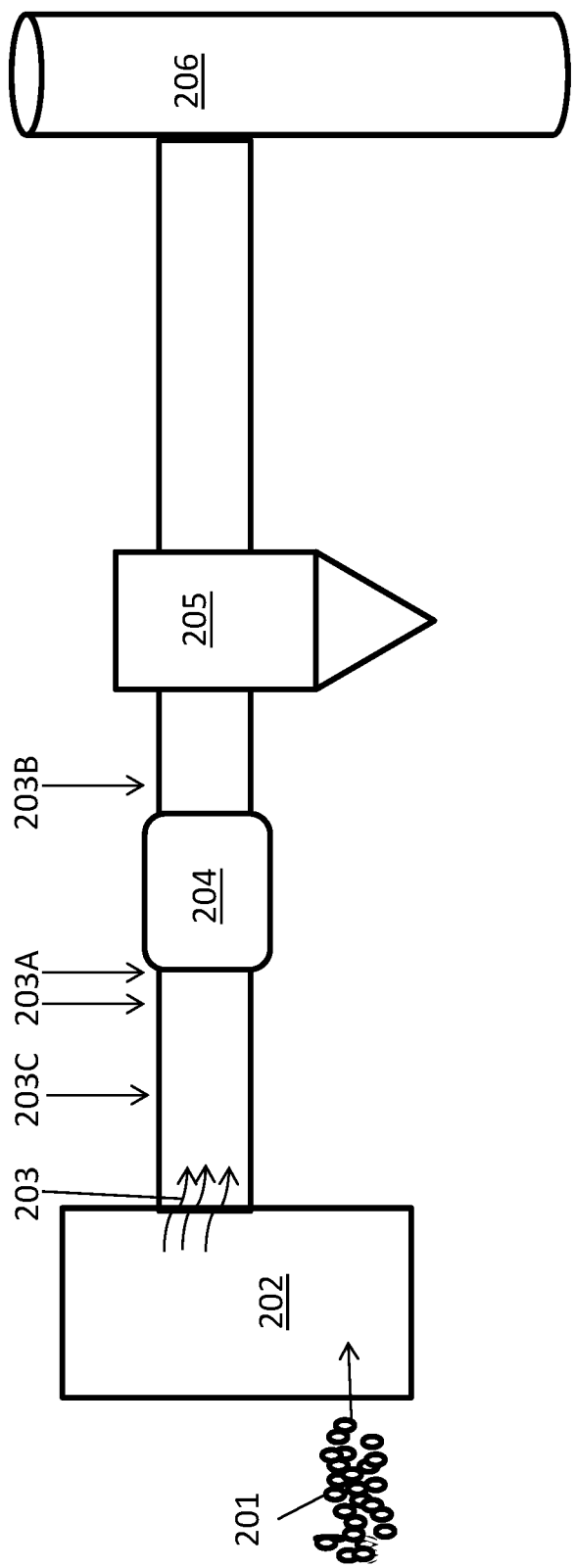
FIG. 2 illustrates a plant configuration and method for the capture and sequestration of contaminants from a flue gas stream.

In another embodiment, a method for the treatment of the flue gas stream to remove contaminants such as mercury therefrom is provided that includes the step of contacting the flue gas stream with a sorbent composition as described herein, e.g., including a powdered activated carbon sorbent and an ancillary catalyst component comprising at least one constituent selected from the group consisting of a catalytic metal, a precursor to a catalytic metal, a catalytic metal compound, and a precursor to a catalytic metal compound. One exemplary method is illustrated in FIG. 2. A feedstock (e.g., a fuel) such as coal 201 is added to a boiler 202 where the coal is combusted and produces a flue gas stream 203. As illustrated in FIG. 2, the flue gas stream 203 may then proceed to an air heater unit 203 where the temperature of the flue gas stream 203 is reduced. Thereafter, the flue gas stream 203 may be introduced to a separation unit 205 such as an electrostatic precipitator or a fabric filter baghouse which removes particulate matter from the flue gas, before exiting out a stack 206. For example, a cold-side 204 (i.e., after the air heater unit) electrostatic precipitator (ESP) can be used to remove particulate matter from the flue gas. It will be appreciated by those skilled in the art that the plant may include other devices not illustrated in FIG. 2, such as a selective catalytic reduction unit (SCR), a wet or dry scrubber and the like, and may have numerous other configurations. In order to capture contaminants from the flue gas stream, the sorbent compositions disclosed herein, including the sorbent and the ancillary catalyst component, and optionally the catalytic promoter, may be introduced to (e.g., injected into) the flue gas stream 203 either before 203A or after 203B the air heater unit 204, but before the separation unit 205 which will remove the sorbent composition from the flue gas.

Alternatively or in addition to the introduction of the sorbent compositions disclosed herein to the flue gas stream, the ancillary catalyst component may be added to the fuel (e.g., the coal 201) before or during combustion in the boiler 202. Such an addition may be made in lieu of or in addition to the injection of a sorbent composition including a solid sorbent and an ancillary catalyst component to the flue gas stream.

In another embodiment, the ancillary catalyst component may also be added directly to the flue gas stream separate from the solid sorbent, such as by injecting the ancillary catalyst component into the flue gas stream prior to addition of the sorbent 203C to the flue gas stream. The ancillary catalyst component may also be co-injected 203A into the flue gas stream with the sorbent. As is noted above, if the ancillary catalyst component comprises a precursor to a catalytic metal or a precursor to a catalytic metal compound, then the ancillary catalyst component should be injected at a point that will permit sufficient time for conversion of the precursor to the catalytic metal or the catalytic metal compound in the flue gas stream.

A method for capture of a contaminant such as mercury is schematically illustrated in FIGS. 3A and 3B. The sorbent composition may have a surface 301 with mesopores 302 and micropores 303. An ancillary catalyst component 304, being a catalytic metal or a catalytic metal compound, such as copper (II) oxide (CuO), for example, may be dispersed thereon as shown in FIG. 3A. As shown in FIG. 3B, when a contaminant mercury species 305 such as $Hg^0$ contacts the surface 301, the ancillary catalyst component 304, may catalyze the oxidation of the $Hg^0$ species to $Hg^{+/2+}$, e.g., to an oxidized mercury species. The $Hg^{+/2+}$ species subsequently may be more easily captured (e.g., sequestered) by the sorbent surface 301.

In one example a sorbent composition as described herein is formed using a powdered activated carbon sorbent such as PowerPAC® or FastPAC (ADA Carbon Solutions, LLC, Littleton, Colo.). An ancillary catalyst component metal or metal compound, such as those metals or metal compounds disclosed herein, may be coated onto the sorbent, e.g., from a solution as described in FIG. 1 step 106A or 106B. The ancillary catalyst component metal compounds may be in the form of substantially insoluble metal or metal compounds, or precursors thereto, such as particulate oxides having a median size (diameter) of not greater than about 10 µm, or even not greater than about 1 µm, or even not greater than about 100 nm, or even not greater than about 50 nm, or even not greater than about 25 nm, or not greater than about 10 nm. Examples of these ancillary catalyst component metal compounds may include copper (II) oxide (CuO), iron (III) oxide ($Fe_2O_3$), cerium (IV) oxide ($CeO_2$), manganese (IV) oxide ($MnO_2$), vanadium (V) oxide ($V_2O_5$), and zinc (II) oxide (ZnO). Alternately, the metal compounds, or metal precursors such as salts, that may be chlorides, sulfates, nitrates, or hydroxides, for example, may be soluble in a liquid phase (e.g., water) used for application to the powdered activated carbon sorbent. Examples of these salts may include copper (II) chloride ($CuCl_2$), copper (II) sulfate ($CuSO_4$), copper (II) nitrate ($Cu(NO_3)_2$), copper (II) hydroxide ($Cu(OH)_2$), copper (II) carbonate ($CuCO_3$), iron (III) chloride ($FeCl_3$), iron (III) nitrate ($Fe(NO_3)_3$), iron (III) sulfate ($Fe_2(SO_4)_3$), iron (II) chloride ($FeCl_2$), and zinc sulfate ($ZnSO_4$). A metal species that is small in size, and therefore exhibits a high surface area to volume ratio, may have increased effectiveness as a catalyst. The ancillary catalyst component also may be dry admixed with the sorbent. Alternately, the ancillary catalyst component in a solution may be added to the sorbent such as by coating the sorbent with a solution or slurry, the solution or slurry possibly also including one or more halogens. Halogens may for example include halogen-containing compounds such as sodium, calcium, and ammonium salts of chloride, bromide, magnesium, phosphorous, potassium, and/or iodide, or combinations thereof. In one example, no added halogen is required to meet mercury capture standards. In yet another example, a lower amount of halogen may be needed when an ancillary catalyst component is used.

In addition, the optional catalytic promoter discussed above may be used to enhance the catalytic potential of the ancillary catalyst component. Such catalytic promoters may include Group 1 metals (alkali metals), Group 2 metals (alkaline earth metals), and Group 3 metals. Particular examples include Li, Na, K, Mg, Ca, Ba, and Al.

In some embodiments, the catalytic metal precursor or catalytic metal compound precursor may be capable of converting to the catalytic metal or catalytic metal compound in-situ, i.e., upon injection of the precursor into the flue gas stream. In another embodiment, the composition may be post-treated, e.g., in the absence of a catalytic promoter, to convert the catalytic metal precursor or catalytic metal compound precursor on the surface of the sorbent to form the active form of the metal or metal compound. This post-treatment may include a variety of treatments to convert the precursor to a species of higher catalytic activity, such as the application of a chemical treatment such as a reducing agent, oxidizing agent, or sulfiding agent, and/or the application of heat such as in a heated reducing or oxidizing environment.

In another example, the ancillary catalyst component may be directly added to the coal feed that is used to manufacture an activated carbon sorbent, e.g., at the point that the coal enters the activation furnace, to enrich the activated sorbent with the catalytic species. Examples include copper species such as aqueous solutions/slurries of: $CuCl_2$, $Cu(NO_3)_2$, $Cu(OH)_2$, or $CuCO_3$. At the high furnace temperatures these additives (e.g., precursors) convert to the metal oxide which may then be adsorbed on the sorbent surface.

In yet another example, the catalytic metal or metal compound may be added to the coal feed prior to incineration at an EGU or boiler facility thereby enhancing oxidation of mercury.

EXAMPLE 1

A comparative sample, Sample A, comprised of a PAC, derived from a lignite coal feedstock, and an oxidizing agent is prepared. The PAC is characterized as having a median particle size (D50) of about 12 µm, a surface area of at least about 350 m²/g, a particle density of at least about 0.3 g/cc, and a total pore volume of at least about 0.3 cc/g. Sample A also contains about 5.5 wt. % Br as the oxidizing agent. The ability to capture mercury is assessed using the DMI test, and this result is provided in Table 1.

EXAMPLE 2

To test for enhanced mercury capture performance, a catalytic metal compound, here being copper (II) chloride, is added to comparative Sample A to form Sample B. For preparation of Sample B, a copper (II) chloride solution is made by dissolving 36.25 g of copper (II) chloride in 50 g of deionized water. 5.03 g of this solution is sprayed onto 100 g of Sample A while fluidizing the PAC in a mixer for 10 minutes. The sprayed PAC is dried at approximately 150° C. for 2 hours to yield Sample B, a sorbent composition comprising PAC as a sorbent, about 1 wt. % Cu (as $CuCl_2$) as an ancillary catalyst component and about 5.5 wt. % Br. The ability to capture mercury is assessed using the DMI test, and this result is provided in Table 1.

EXAMPLE 3

To test for enhanced mercury capture performance, a catalytic metal compound, here being copper (II) sulfate, is added to comparative Sample A to form Sample C. For preparation of Sample C, a copper (II) sulfate solution is made by dissolving 25 g of copper (II) sulfate in 100 g of deionized water. 25.12 g of this solution is sprayed onto 100 g of Sample A while fluidizing the PAC in a mixer for 10 minutes. The sprayed PAC is dried at approximately 150° C. for 2 hours to yield Sample C a sorbent composition including PAC as a sorbent, having about 2 wt. % Cu (as $CuSO_4$) and about 5.5 wt. % Br. The ability to capture mercury is assessed using the DMI test, and this result is provided in Table 1.

EXAMPLE 4

To test for enhanced mercury capture performance, a catalytic metal compound, here being iron (II) chloride, is added to comparative Sample A to form Sample D. For preparation of Sample D, an iron (II) chloride solution is made by dissolving 20 g of iron (II) chloride in 70 g of deionized water. 16.02 g of this solution is sprayed onto 100 g of Sample A while fluidizing the PAC in a mixer for 10 minutes. The sprayed sample is dried at approximately 150° C. for 2 hours to yield a sorbent composition including PAC as a sorbent with about 1 wt. % Fe (as $FeCl_2$) and about 5.5 wt. % Br. Approximately 4.196 g of deionized water is added to form Sample D having about 10 wt. % moisture. The ability to capture mercury is assessed using the DMI test, and this result is provided in Table 1.

EXAMPLE 5

To test for enhanced mercury capture performance, a catalytic metal compound, here being iron (III) sulfate, is added to comparative Sample A to form Sample E. For preparation of Sample E, an iron (III) sulfate solution is made by dissolving 60 g of iron (III) sulfate in 50 g of deionized water. 9.22 g of this solution is sprayed onto 100 g of Sample A while fluidizing the PAC in a mixer for 10 minutes. The sprayed sample is dried at approximately 150° C. for 2 hours to yield a sorbent composition including PAC as a sorbent with about 1 wt. % Fe (as $Fe_2(SO_4)_3$) and about 5.5 wt. % Br. Approximately 4.196 g of deionized water is added to form Sample E with about 10 wt. % moisture. The ability to capture mercury is assessed using the DMI test, and this result is provided in Table 1.

EXAMPLE 6

To test for enhanced mercury capture performance, a catalytic metal compound, here being iron (III) chloride, is added to comparative Sample A to form Sample F. For preparation of Sample F, an iron (III) chloride solution is made by dissolving 200 g of iron (III) chloride in 100 g of deionized water. 14.51 g of this solution is sprayed onto 100 g of Sample A while fluidizing the PAC in a mixer for 10 minutes. The sprayed sample is dried at approximately 150° C. for 2 hours to yield a sorbent composition including PAC as a sorbent with about 2 wt. % Fe (as $FeCl_3$) and about 5.5 wt. % Br. Approximately 3.884 g of deionized water is added to form Sample F with about 11 wt. % moisture. The ability to capture mercury is assessed using the DMI test, and this result is provided in Table 1.

EXAMPLE 7

To test for enhanced mercury capture performance, a catalytic metal compound, here being zinc sulfate, is added to comparative Sample A to form Sample G. For preparation of Sample G, a zinc sulfate solution is made by dissolving 37.1 g of zinc sulfate in 100 g of deionized water. 15.85 g of this solution is sprayed onto 100 g of Sample A while fluidizing the PAC in a mixer for 10 minutes. The sprayed sample is dried at approximately 150° C. for 2 hours to yield a sorbent composition including PAC as a sorbent with about 2 wt. % Zn (as $ZnSO_4$) and about 5.5 wt. % Br. Approximately 3.348 g of deionized water is added to form Sample G with about 8 wt. % moisture. The ability to capture mercury is assessed using the DMI test, and this result is provided in Table 1.

TABLE 1

| | DMI results for compositions of matter | | |
|---|---|---|---|
| Sample | Ancillary catalyst component | Wt. % metal | DMI (µg/g) |
| A | none | N/A | 174 |
| B | Copper (II) chloride | 1 wt. % Cu | 597 |
| C | Copper (II) sulfate | 2 wt. % Cu | 401 |
| D | Iron (II) chloride | 1 wt. % Fe | 303 |
| E | Iron (III) sulfate | 1 wt. % Fe | 579 |
| F | Iron (III) chloride | 2 wt. % Fe | 436 |
| G | zinc sulfate | 2 wt. % Zn | 555 |

The example sorbent compositions disclosed herein having ancillary catalyst component metal compounds demonstrate an increased ability to capture mercury as evidenced by the DMI results indicated in Table 1. The addition of the ancillary catalytic metals Fe, Cu, Mn, Zn and combinations thereof to the Sample A sorbent increased mercury capture ability by as much as two- to three-fold when compared to the sorbent composition comprising the NaBr oxidizing agent alone.

While various examples of a sorbent composition have been described in detail, it is apparent that modifications and adaptations of those examples will occur to those skilled in the art. However, is to be expressly understood that such modifications and adaptations are within the spirit and scope of the present disclosure.

What is claimed is:

1. A method for the removal of mercury from a flue gas stream, the method comprising the steps of:
   combusting a fuel source, the combusting generating a flue gas stream comprising one or more contaminants;
   contacting the flue gas stream with (i) a solid sorbent comprising powdered activated carbon and having a mean particle diameter of not greater than about 25 µm, and (ii) an ancillary catalyst component, wherein the ancillary catalyst component comprises a metal salt having a metal and a cation, where the metal is selected from the group consisting of Fe, Cu, Mn, Zn, and the cation is selected from the group of a chloride, a sulfate, a carbonate, and a nitrate;
   maintaining the ancillary catalyst component in contact with the flue gas stream for a period of time sufficient to catalytically oxidize at least a portion of the mercury and form an oxidized contaminant species; and
   sequestering the oxidized contaminant species with the solid sorbent.

2. The method recited in claim 1, wherein the solid sorbent has a mean particle diameter (D50) of not greater than about 20 µm.

3. The method recited in claim 1, wherein the solid sorbent has a mean particle diameter (D50) of not greater than about 15 µm.

4. The method recited in claim 1, wherein the catalytic metal compound is selected from the group consisting of copper (II) chloride ($CuCl_2$), copper (II) nitrate ($Cu(NO_3)_2$), copper (II) carbonate ($CuCO_3$), iron (III) chloride ($FeCl_3$), iron (III) nitrate ($Fe(NO_3)_3$), iron (III) sulfate $Fe_2(SO4)_3$ and zinc sulfate ($ZnSO_4$).

5. The method recited in claim 1, further comprising the step of contacting the flue gas stream with a catalytic promoter.

6. The method recited in claim 5, wherein the catalytic promoter comprises a metal selected from the group consisting of alkali metals and alkaline earth metals.

7. The method recited in claim 5, wherein the catalytic promoter comprises a metal selected from the group consisting of Al, Li, Na, K, Be, Ca, Sr, Ba, Sc, Y, Mg and combinations thereof.

8. The method recited in claim 1, wherein the flue gas stream is contacted with the solid sorbent and with the ancillary catalyst component in the absence of any added halogen that is not a constituent of the ancillary catalyst component.

9. The method recited in claim 1, wherein the ancillary catalyst component is dispersed on the solid sorbent to form a sorbent composition comprising catalytically active sorbent particles.

10. The method recited in claim 1, wherein the ancillary catalyst component is physically separate from the solid sorbent when contacted with the flue gas stream.

11. The method recited in claim 10, wherein the ancillary catalyst component is injected into the flue gas stream separate from the solid sorbent.

12. The method recited in claim 11, wherein the ancillary catalyst component is added to the fuel source before or during combustion of the fuel source.

13. The method recited in claim 1, wherein the fuel source comprises coal.

14. The method recited in claim 1, wherein the cation is selected from the group consisting of a chloride, a sulfate and a nitrate.

15. The method recited in claim 1, wherein the solid sorbent comprises activated carbon derived from lignite coal.

16. The method recited in claim 1, wherein the solid sorbent comprises at least about 0.5 wt. % and not greater than about 5 wt. % of the ancillary catalyst component.

17. A method for the removal of one or more contaminants from a flue gas stream, the method comprising the steps of:
combusting a fuel source, the combusting generating a flue gas stream comprising one or more contaminants;
contacting the flue gas stream with a solid sorbent and with an ancillary catalyst component, wherein the ancillary catalyst component comprises a metal salt having a metal and a cation, where the metal is selected from the group consisting of Fe, Cu, Mn, Zn, and the cation is selected from the group of a chloride, a sulfate, a carbonate, and a nitrate;
maintaining the ancillary catalyst component in contact with the flue gas stream for a period of time sufficient to catalytically oxidize at least a portion of the one or more contaminants and form an oxidized contaminant species; and
sequestering the oxidized contaminant species with the solid sorbent;
wherein the ancillary catalyst component is physically separate from the solid sorbent when contacted with the flue gas stream.

18. The method recited in claim 17, wherein the ancillary catalyst component is injected into the flue gas stream separate from the solid sorbent.

19. The method recited in claim 17, wherein the ancillary catalyst component is added to the fuel source before or during combustion of the fuel source.

* * * * *